United States Patent [19]
Colquhoun et al.

[11] Patent Number: 5,693,740
[45] Date of Patent: Dec. 2, 1997

[54] AROMATIC POLYSULPHONES

[75] Inventors: Howard Matthew Colquhoun, Cheshire; David Frank Lewis, Northwich, both of United Kingdom

[73] Assignee: United Utilites PLC, United Kingdom

[21] Appl. No.: 647,976

[22] PCT Filed: Dec. 2, 1994

[86] PCT No.: PCT/GB94/02652

§ 371 Date: Oct. 15, 1996

§ 102(e) Date: Oct. 15, 1996

[87] PCT Pub. No.: WO95/15351

PCT Pub. Date: Jun. 8, 1995

[30] Foreign Application Priority Data

Dec. 2, 1993 [GB] United Kingdom ............ 9324731

[51] Int. Cl.[6] .................. C08G 8/02; C08G 75/23
[52] U.S. Cl. .............. 528/171; 528/125; 528/126; 528/128; 528/174; 528/212; 528/218; 528/219; 528/373
[58] Field of Search ............... 528/373, 125, 528/126, 171, 174, 128, 212, 218, 219

[56] References Cited

U.S. PATENT DOCUMENTS

| | | | |
|---|---|---|---|
| 4,056,511 | 11/1977 | Staniland | 260/49 |
| 4,176,222 | 11/1979 | Cinderey et al. | 528/126 |
| 4,268,650 | 5/1981 | Rose | 525/534 |
| 4,273,903 | 6/1981 | Rose | 525/534 |
| 4,320,224 | 3/1982 | Rose et al. | 528/125 |
| 4,775,738 | 10/1988 | Mayska et al. | 528/173 |
| 5,047,496 | 9/1991 | Eckel et al. | 528/171 |

FOREIGN PATENT DOCUMENTS

| | | |
|---|---|---|
| 0 008 894 | 3/1980 | European Pat. Off. . |
| 0 008 895 | 3/1980 | European Pat. Off. . |
| 2 245 577 | 1/1992 | United Kingdom . |

*Primary Examiner*—James J. Seidleck
*Assistant Examiner*—Duc Truong
*Attorney, Agent, or Firm*—Michael, Best & Friedrich

[57] ABSTRACT

An aromatic polyethersulphone incorporating sub-unit (1) where A is an electron withdrawing group, the designation "o,p" represents that the bond is at the ortho or para position to the A group, and X is selected from: OH; —O M where M is an organic or inorganic cation (other than hydrogen) and n is at least 1; —NR1R2 where R1 and R2 are the same or different and are selected from hydrogen and alkyl, aryl, aminoalkylene or ammonoalkylene groups; and —OR3 where R3 is an alkyl or aryl group; either as the only sub-units of the polymer or in combination with comonomer units. The polymer are useful for the production of membranes for separation processes:

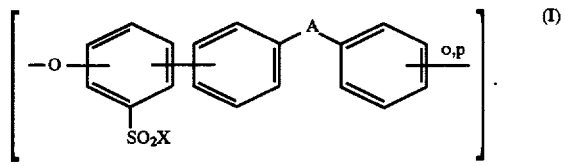

38 Claims, No Drawings

AROMATIC POLYSULPHONES

The present invention relates to aromatic polysulphones which are useful particularly, but not exclusively, as membranes for filtration operations.

Composite membranes comprising a thin film of a hydrophilic, sulphonated aromatic polyethersulphone supported on an ultrafiltration membrane are known to have good chemical stability (particularly to extremes of pH and to chlorinated feed waters) and to be usable in reverse osmosis and nanofiltration. Examples of sulphonated polymers which have been used in the past to produce such membranes are shown below as Polymers A, B, and C.

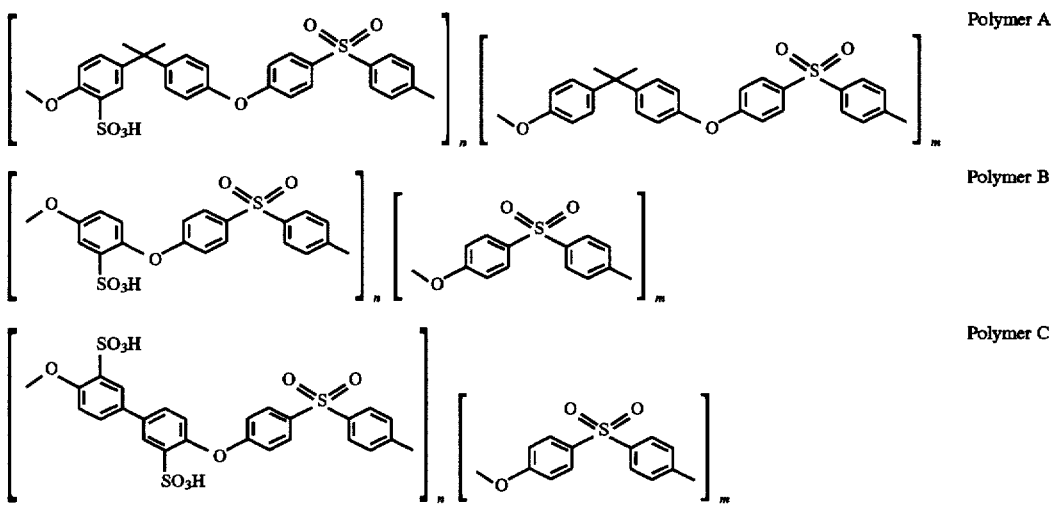

Polymer A

Polymer B

Polymer C

Polymer C has particular advantages in that (i) the presence of the biphenyl linkage in place of an isopropylidene or ether linkage provides a material with significantly improved thermo-mechanical and chemical stability, (ii) the precursor (i.e. non-sulphonated) polymer is readily synthesised at high molecular weight, and (iii) sulphonation of this material to give Polymer C proceeds rapidly and cleanly at room temperature.

However, using polymers of type C, it has not proved possible to fabricate reverse osmosis membranes with an industrially viable combination of salt rejection and water flux. We have found for example that although composite membranes with good fluxes can be readily obtained from polymers of type C, it is difficult to obtain adequate salt rejection.

It is therefore an object of the present invention to provide sulphonated aromatic polysulphones, and membranes fabricated therefrom, which obviate or mitigate the abovementioned disadvantages.

According to a first aspect of the present invention there is provided an aromatic polyethersulphone incorporating the following sub-unit I:

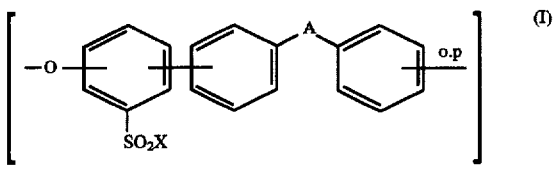

(I)

where A is an electron withdrawing group, the designation 'o,p' represents that the bond is at the ortho or pare position to the A group, and X is selected from;

—OH;

—O$^-$(M$^{n-}$)$_{1/n}$ where M is an organic or inorganic cation (other than hydrogen) and n is at least 1;

—NR$_1$R$_2$ where R$_1$ and R$_2$ are the same or different and are selected from hydrogen, and alkyl, aryl, aminoalkylene or ammonioalkylene groups; and —OR where R$_3$ is an alkyl or aryl group:

either as the only sub-units of the polymer or in combination with comonomer units.

In the above formula, A is preferably a carbonyl linkage (—CO—) or, more preferably, a sulphonyl linkage (—SO$_2$—). If X is —O$^-$(M$^{n+}$)$_{1/n}$ then the cation may have a valency of one or more. If the valency is greater than 1 then it will be appreciated that the —O$^-$ moiety is associated with a fraction 1/n of the cation. M may for example be an alkali metal, alkaline earth metal, or a higher valency metal ion, eg Al$^{3+}$. Preferably M is sodium or potassium.

If X is —NR$_1$R$_2$ then at least one of R$_1$ and R$_2$ is preferably other than hydrogen. If R$_1$ and/or R$_2$ is alkyl it preferably has less than 4 carbon atoms. A suitable example of an aminoalkylene group for R$_1$ and R$_2$ is —(CH$_2$)$_m$—NH$_2$ where m is less than 4, preferably 2. Correspondingly a suitable ammonioalkylene group is —(CH$_2$)$_m$—N$^+$R$_4$R$_5$R$_6$ where R$_4$, R$_5$ and R$_6$ are independently hydrogen, alkyl or aryl. If X is —OR$_3$ and R$_3$ is alkyl it preferably has less than 4 carbon atoms.

Polymers in accordance with the invention are hydrophilic by virtue of the presence of the —SO$_2$X groups and are eminently suitable for use as membranes in filtration operations effected in an aqueous environment.

Therefore according to a second aspect of the invention there is provided a porous or non-porous membrane comprising an aromatic polyethersulphone incorporating the sub-unit (I) defined above either alone or in combination wish comonomer units.

Membranes in accordance with the second aspect of the invention may for example be asymmetric membranes, composite membranes or dense films and may be used in a variety of separation processes including reverse osmosis, electrodialysis, nanofiltration, ultrafiltration, microfiltration, gas separation, pervaporation, haemodialysis and haemofiltration.

A particularly preferred form of membrane in accordance with the invention is a composite membrane comprising a thin film of the polymer supported on an ultrafiltration membrane. Such composite membranes are particularly suitable as reverse osmosis membranes since they have been surprisingly found not to suffer the problem of poor reverse osmosis performance associated with polymer C (see above).

The sub-unit (I) in the polymers of the invention is preferably of the formula (II):

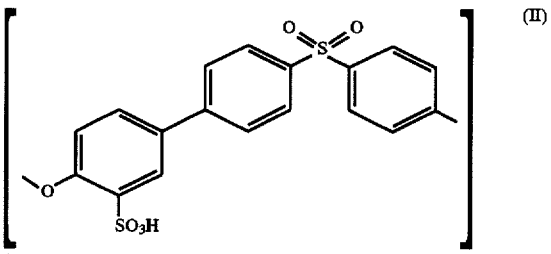

The polymers of the invention may comprise only units (I) (or (II)) or may incorporate comonomer units, eg of the formula (III) or (IV).

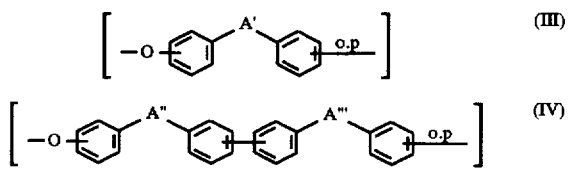

In formulae (III) and (IV), A', A", and A'" represent the same or different electron withdrawing linkages, most preferably carbonyl (—CO—) or sulphone (—SO$_2$—) linkages. Preferably also all bonds and substituents shown in formulae (III) and (IV) are (on any one aromatic ring) in para relationship to each other.

It is also possible for the comonomer units to be of the formula (V):

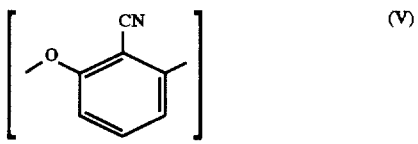

The comonomer unit (if present) is most preferably of the formula (VI):

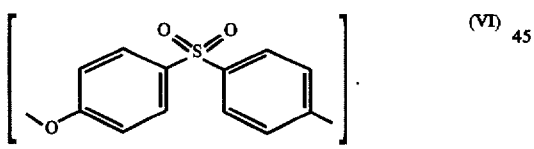

If comonomer units are incorporated in the polymer then sub-units (I) may provide 1–99%, more preferably at least 10% eg at least 25%, by mole of the total number of monomer units present in the polymer.

Preferred copolymers in accordance with the invention are of the formula (VII)

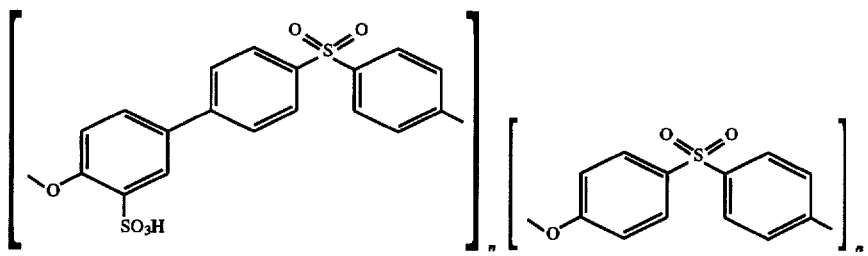

where the ratio is of m:n is less than 10:1, more preferably less than 4:1, eg 3:1.

The polymers of the invention preferably have a molecular weight of 2000 to 100,000, more preferably 5000 to 50,000. The inherent viscosity of the polymers as measured at a concentration of 1% in N-methylpyrrolidone at 25° C. will generally be in the range of 0.3–5.0.

Synthesis of the polymers of the invention for which X=—OH (i.e. the sulphonic acid polymers) may be effected by (a) polycondensing a monomer containing an anion as represented by formula (VIII)

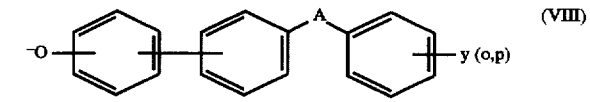

where A is an electron withdrawing linkage and Y is a leaving group either alone or in combination with at least one comonomer which is condensable therewith and which gives a substantially non-sulphonatable copolymer unit, said polycondensation or copolycondensation being effected in a solvent for the monomer; and (b) sulphonating the resultant polymer.

In one embodiment of this process the anion of formula (VIII) is generated in situ during the polycondensation or copolycondensation from a monomer of formula (VIIIa)

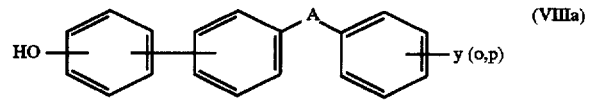

where A and Y are as defined above, the polycondensation being effected in the presence of a base. A stoichiometric amount of the base is preferably used. The base may for example be an alkali metal carbonate or an alkali metal fluoride, e.g. potassium fluoride.

It will be appreciated the preferred polymers in accordance with the invention, i.e. those incorporating sub-unit (II) in which X=—OH, may be prepared by polycondensation or copolycondensation of a monomer of formula (IX)

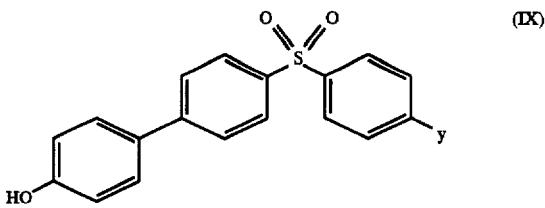

Compound IX in which Y=Cl may be named as 4-(4-chlorophenylsulphonyl)-4'-hydroxydiphenyl and can be synthesised by the procedure described in *Polymer* 1977, Vol 18, April, pages 354 et seq. The analogous compound in which the —SO₂— linkage is replaced by a carbonyl linkage (i.e. —CO—) may be synthesised by the procedures described in EP-A-0 232 992 (ICI Plc). Other compounds embraced by formulae (VII) and (IX) may be synthesised by procedures known in the art.

In an alternative embodiment of the process, the anion (VIII) may be obtained by reaction of the corresponding free hydroxy compound with a base (e.g. by reaction with the appropriate alkali metal hydroxide and removal of water) prior to the polycondensation or copolycondensation step.

The polycondensation or copolycondensation step will generally be effected at a temperature in the range 150°–330° C., preferably 250°–300° C.

Comonomers which may preferably be used in step (a) are of the general formula X, XI, and XII

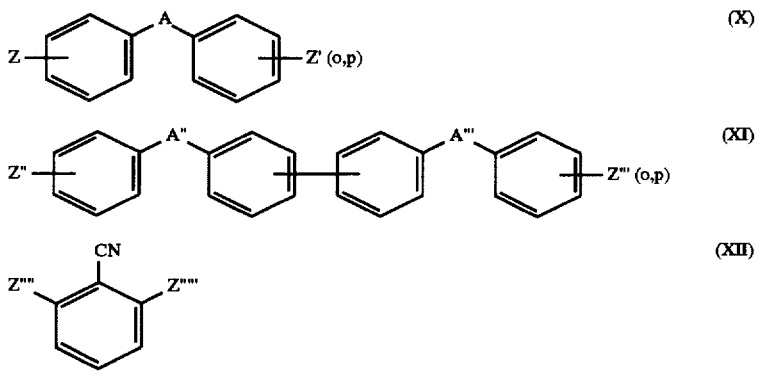

where Z, Z', Z", Z'", Z"" and Z""' are the same or different and are selected from hydroxyl groups and leaving groups (preferably halogen atoms (eg chlorine)).

In the comonomers of formulae X and XI (and correspondingly the copolymer units derived from these comonomers) the aromatic rings which are bonded to the electron withdrawing groups A', A", A'" are non-sulphonatable due to the presence of these latter groups.

The solvent may be a dipolar aprotic solvent as commonly used for substitution reactions, eg dimethylformamide, dimethylsulphoxide, N-methylpyrrolidone, sulpholane, dimethyl sulphone and diphenyl sulphone although other solvents which are substantially non-reactive under the reaction conditions may be employed. The preferred solvent is diphenyl sulphone.

The reaction will generally be effected at a temperature in the range 150°–330°, preferably 250°–300° C.

The sulphonation step (b) is most conveniently effected using concentrated (95–100%) sulphuric acid most preferably 98% sulphuric acid. Using concentrated sulphuric acid, sulphonation occurs cleanly in high yield without degradation of the polymer. Other sulphonating agents such as oleum, sulphur trioxide, or a sulphur trioxide derivative such as SO₃-pyridine or SO₃-triethylphosphate may be used.

Sulphonation has been found to occur substantially as mono-sulphonation in one ring of the oxybiaryl residue to give a sulphonated entity as shown for sub-unit (I). The actual position of substitution in that ring will be determined by the position of the other substituents therein. For example, sulphonation of a polymer obtained by condensation of a monomer of formula (IX) yields a polymer sulphonated at the position shown for sub-unit (II).

Since sulphonation is specific to the oxybiaryl residue it will be appreciated that any desired level of sulphonation of the polymer may be obtained by varying the proportion of comonomer units used in step (a).

In an alternative method of synthesis for polymers of formula (I) in which X=—OH, a compound of the formula VIII may initially be sulphonated to give the sulphonic acid derivative which can then be condensed, optionally with comonomers as described above, to give the final polymer.

The abovedescribed procedures yield the free sulphonic acid form of the polymers (i.e. X=—OH). Such polymers may then be converted into those in which X=—O⁻M⁺ —NR₁R₂ or —OR₃ by procedures known in the art. Thus to obtain polymers in which X=—O⁻ᴹ⁺, the free sulphonic acid form may be treated with a base incorporating the Mⁿ⁺ cation. Thus if Mⁿ⁺ represents an alkali metal, the free sulphonic acid form of the polymer may be treated with alkali metal hydroxide, eg. NaOH or KOH. Polymers in which X=—NR₁R₂ may be obtained by conversion of the free sulphonic acid form to the corresponding polyether sulphonyl halide (this conversion may for example be effected with thionyl chloride to obtain the sulphonyl chloride) followed by reaction with the corresponding amine or alcohol. If one of R₁ and R₂ is an ammonioalkylene group then the free sulphonic acid may be reacted with a diamine, the free amine group of which is then converted to an ammonium group. The aforementioned polyether sulphonyl halides are novel intermediates and are therefore provided as a further aspect of the invention.

If desired, membranes produced from polymers in accordance with the invention may be over-coated with a cross-linked optionally protected polyol as disclosed in WO 94/17905. The polyol may for example by polyvinylalcohol and may be protected by formaldehyde.

The invention will be further described by way of example only with reference to the following non-limiting examples.

EXAMPLE 1

Polymer VII was synthesised in two stages, involving first the polycondensation of monomer (IX) (12.50 mmol, X=Cl) with 4,4'-dihydroxydiphenylsulphone (18.75 mmol) and 4,4'-dichlorodiphenylsulphone (18.90 mmol) in the presence of potassium carbonate (25.5 mmol). The reactants were mixed with diphenyl sulphone (56 g) as solvent, blanketed with a slow purge of dry nitrogen, and heated with stirring over 5 hours to 280° C. After 30 minutes at this temperature the viscous reaction mixture was cooled to room temperature and the resulting solid was milled to a fine powder. This was extracted successively with water and then methanol at reflux, and dried to given a 11.0 g of a copolymer with inherent viscosity in N-methylpyrrolidone (NMP) of 0.66. In a second stage, 3.0 g of this material was dissolved in 50 cm³ of 98% sulphuric acid and the resulting clear, pale yellow solution was allowed to stand for 16 hours. The solution was then added dropwise to stirred deionised water, giving white beads of polymer. After washing acid-free with water at 60° C., the beads were filtered off and dried at 70° C. under vacuum, to give 3.0 g of the sulphonated Polymer VII (m=3n), having an inherent viscosity in NMP of 0.96.

A dry polysulphone ultrafiltration membrane, impregnated with 1,4-butanediol to promote re-wetting of the pores, and having a pure water permeability of 0.56 m³/m²/day/bar, was coated using a bead-coated with a 0.7% (w/w) solution of Polymer VII (ion exchange capacity 0.92 meq/g) in a solvent comprising methoxyethanol (57%), methanol (38%), sulphuric acid (0.25%), and water (4.75%). The membrane was dried at 80° C. On testing in reverse osmosis (2000 ppm NaCl, 40 bar) the membrane gave a water flux of 78 US gallons/ft²/day (GFD) and a salt rejection of 95.9%.

COMPARATIVE EXAMPLE 1

A dry polysulphone ultrafiltration membrane, as in Example 1, was coated using a bead-coater with a 0.7% (w/w) solution of Polymer C (m=6n, ion exchange capacity= 0.92 meq/g, inherent viscosity=0.73) in a solvent comprising methoxyethanol (57%), methanol (38%), sulphuric acid (0.25%), and water (4.75%). The membrane was dried at 80° C. On testing in reverse osmosis (2000 ppm NaCl, 40 bar) the membrane gave a water flux of 135 GFD and a salt rejection of 82.9%.

It will thus be seen that polymer VII (i.e. one in accordance with the invention) gives superior salt rejection characteristics to one formed from polymer C in an otherwise identical membrane.

EXAMPLE 2

Example 1 was repeated but using proportions of monomers such that after sulphonation the resulting Polymer VII, with m=1.5n, had an ion exchange capacity of 1.25 meq/g. The inherent viscosity of this polymer in NMP was 1.23. A composite membrane prepared using this material, under the same conditions as those of Example 1, gave water flux of 4.57 m³/m² day and a salt rejection of 92.7%.

On over-coating this membrane with formaldehyde-protected polyvinyl alcohol, as described in our co-pending patent application PCT/GB94/00198 (WO 94/17905), the salt rejection increased to 97.8% and the flux fell to 2.29 m³/m²/day.

EXAMPLE 3

Example 1 was repeated but using proportions of monomers such that after sulphonation the resulting Polymer VII, with m=4n, had an ion exchange capacity of 0.74 meq/g. The inherent viscosity of this polymer in NMP was 1.13. A composite membrane prepared using this material, under the same conditions as those of Example 1, gave a water flux of 2.37 m³/m²/day and a salt rejection of 96.5%.

On over-coating this membrane with formaldehyde-protected polyvinyl alcohol, as described in WO 94/17905 the salt rejection increased to 99.3% and the flux fell to 1.0 m³/m²/day.

EXAMPLE 4

This Example demonstrates chlorine tolerance of a membrane based on a polymer of the invention:

A composite membrane prepared as in Example 1 was overcoated with formaldehyde-protected polyvinyl alcohol, as described in WO 94/17905. The salt rejection of the resulting membrane on 500 ppm NaCl at 4 bar was 93.5% and the flux was 0.13 m³/m²day. This membrane was run in reverse-osmosis at 60 psi with a feed containing 50 ppm of active chlorine at an average pH of 8.0. After a total chlorine exposure of 38,000 ppm-hrs the membrane showed a rejection of 92.7% and a flux of 0.11 m³/m²/day.

Under the same conditions a composite membrane whose separation layer comprised an aromatic polyamide (Dow-Filmtec FT-30) failed almost completely in that its salt rejection fell from 94.4% to less than 20%.

We claim:

1. An aromatic polyethersulphone incorporating the following sub-unit I:

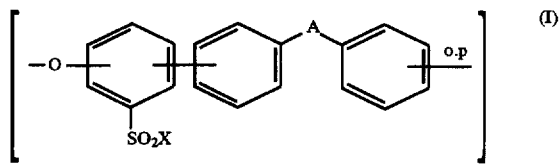

where A is an electron withdrawing group, the designation 'o,p' represents that the bond is at the ortho or para position to the A group, and X is selected from;

—OH;

—O⁻(M$^{n+}$)$_{1/n}$ where M is an organic or inorganic cation (other than hydrogen) and n is at least 1;

—NR$_1$R$_2$ where R$_1$ and R$_2$ are the same or different and are selected from hydrogen, and alkyl, aryl, aminoalkylene or ammonoalkylene groups; and —OR$_3$ where R$_3$ is an alkyl or aryl group;

either as the only sub-units of the polymer or in combination with comonomer units.

2. A polyethersulphone as claimed in claim 1 wherein A is a carbonyl linkage (—CO—).

3. A polyethersulphone as claimed in claim 1 wherein A is a sulphonyl linkage (—SO$_2$—).

4. A polyethersulphone as claimed in claim 1 wherein X is —OH.

5. A polyethersulphone as claimed in claim 1 wherein X is —O⁻(M$^{n+}$)$_{1/n}$ wherein M is an alkali metal, alkaline earth metal or a higher valency metal ion.

6. A polyethersulphone as claimed in claim 1 wherein X is —NR$_1$R$_2$ wherein at least one of R$_1$ and R$_2$ is other than hydrogen.

7. A polyethersulphone as claimed in claim 4 wherein sub-unit (I) is of the formula (II)

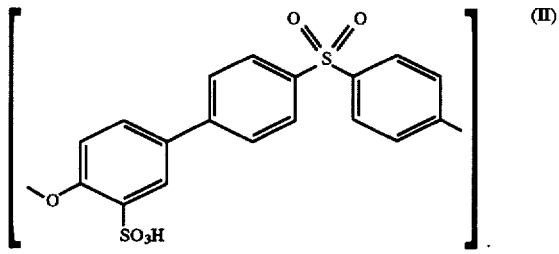

8. A polyethersulphone as claimed in claim 1 additionally comprising comonomer units of the formula (III) or (IV)

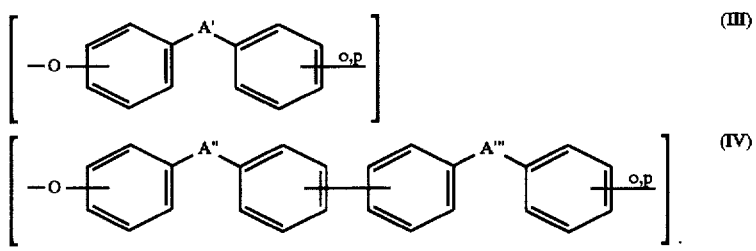 (III)

(IV)

In which A', A" and A'" represent the same or different electron withdrawing linkages.

9. A polyethersulphone as claimed in claim 8 wherein A', A" and A'" are selected from the group consisting of carbonyl (—CO—) and sulphone (—SO$_2$—) linkages.

10. A polyethersulphone as claimed in claim 8 wherein all bonds and substituents for units of the formula (III) and (IV) are (on any one aromatic ring) in para relationship to each other.

11. A polyethersulphone as claimed in claim 8 wherein the comonomer units are of the formula (VI)

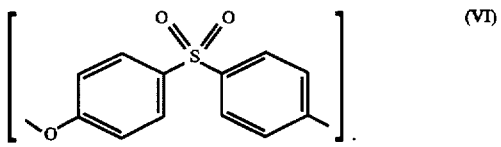 (VI)

12. A polyethersulphone as claimed in claim 11 which is of the formula (VII)

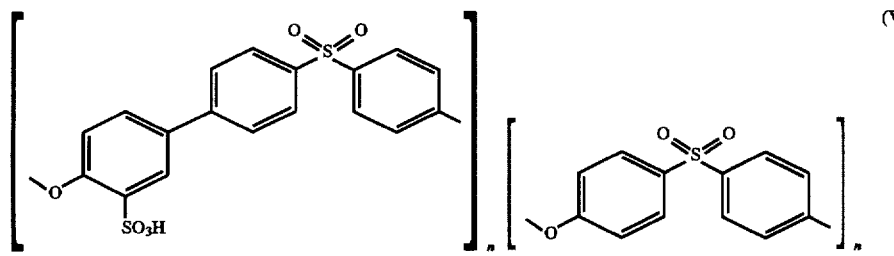 (VII)

where the ratio of m:n is less than 10:1.

13. A polyethersulphone as claimed in claim 12 wherein the ratio of m:n is less than 4:1.

14. A polyethersulphone as claimed in claim 1 incorporating comonomer units of the formula (V)

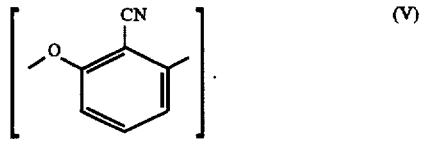 (V)

15. A polyethersulphone as claimed in claim 1 having a molecular weight of 2000 to 100,000.

16. A polyethersulphone as claimed in claim 15 having a molecular weight of 5000 to 50,000.

17. A polyethersulphone as claimed in claim 1 having an inherent viscosity as measured at a concentration of 1% in N-methylpyrrolidone at 25° C. is in the range 0.3–5.0.

18. A method of synthesising a polymer as claimed in claim 1 and for which X=—OH comprising (a) polycondensing a monomer containing an anion as represented by formula (VIII)

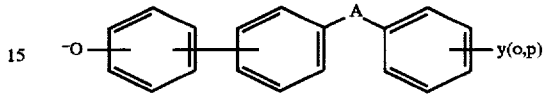 (VIII)

where A is an electron withdrawing linkage and Y is a leaving group either alone or in combination with at least one comonomer which is condensable therewith and which gives a substantially non-sulphonatable copolymer unit, said polycondensation or copolycondensation being effected in a solvent for the monomer; and (b) sulphonating the resultant polymer.

19. A method as claimed in claim 18 wherein the anion of formula (VIII) is generated in situ during the polycondensation or copolycondensation from a monomer of formula (VIIIa)

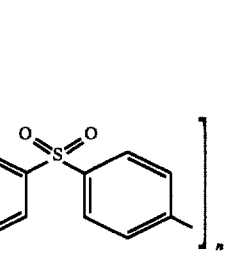 (VIIIa)

where A and Y are as defined in claim 18, said polycondensation being effected in the presence of a base.

20. A process as claimed in claim 19 conducted in the presence of a stoichoimetric amount of the base.

21. A process as claimed in claim 19 wherein the base is an alkali metal carbonate or potassium fluoride.

22. A method of synthesising a polymer as claimed in claim 1 comprising (a) polycondensing a monomer containing an anion as represented by formula (VIIIb)

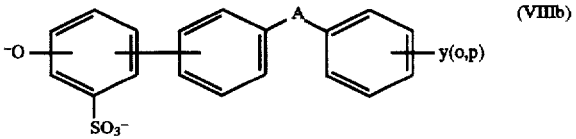 (VIIIb)

where A is an electron withdrawing linkage and Y is a leaving group either alone or in combination with at least one comonomer which is condensable therewith, said polycondensation or copolycondensation being effected in a solvent for the monomer.

23. A process as claimed in claim 18 wherein A is a carbonyl linkage (—CO—) or a sulphonyl linkage (—SO$_2$—).

24. A process as claimed in claim 18 wherein Y is a halogeno-or nitro-substituent.

25. A process as claimed in claim 18 wherein the anion of formula (VIII) is of the formula (IX) in which Y is chlorine:

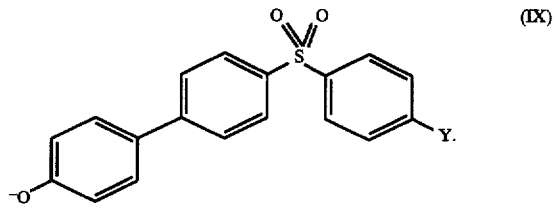

26. A process as claimed in claim 18 which comprises a copolycondensation of the anion of formula (VIII) or (VIIIb) with at least one comonomer of the formula (X), (XI), and (XII)

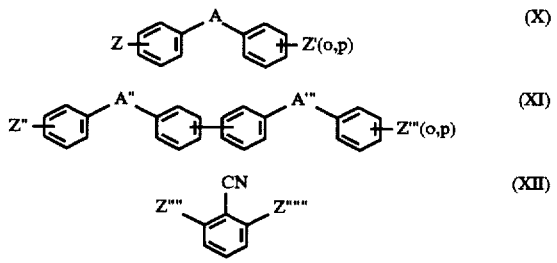

where Z, Z', Z", Z'", Z"" and Z""' are the same or different and are selected from hydroxyl groups and leaving groups (preferably halogen atoms (eg chlorine)).

27. A process as claimed in claim 26 wherein said copolycondensation is effected with two comonomers of the formula (X), one of said comonomers of the formula (X) being such that Z and Z' are both leaving groups and the other comonomer of the formula (X) being such that Z and Z' are both hydroxyl groups.

28. A process as claimed in claim 27 wherein one of the comonomers of formula (X) is 4,4'-dihydroxydiphenylsulphone and the other comonomer of formula (X) is 4,4'-dichlorodiphenylsulphone.

29. A process as claimed in claim 27 wherein the two comonomers (X) are used in substantially equally molar proportions.

30. A process as claimed in claim 18 wherein the solvent is a dipolar aprotic solvent.

31. A process as claimed in claim 30 wherein the solvent is selected from dimethylformamide, dimethylsulphoxide, N-methylpyrrolidone, sulpholane, dimethyl sulphone and diphenyl sulphone.

32. A porous or a non-porous membrane comprising a polyethersulphone as claimed in claim 1.

33. A membrane as claimed in claim 32 which is an asymmetric membrane, composite membrane or dense film.

34. A membrane as claimed in claim 32 adapted for reverse osmosis, electrodialysis, nanofiltration, ultrafiltration, microfiltration, gas separation, pervaporation, haemodialysis or haemofiltration.

35. A membrane as claimed in claim 32 which comprises a thin film of the polyethersulphone supported on an ultrafiltration membrane.

36. A membrane as claimed in claim 32 over-coated with a cross-linked optionally protected polyol.

37. A separation process which comprises the use of a membrane as claimed in claim 32 as the separating medium.

38. An aromatic polyether sulphonyl halide of the formula (XIII)

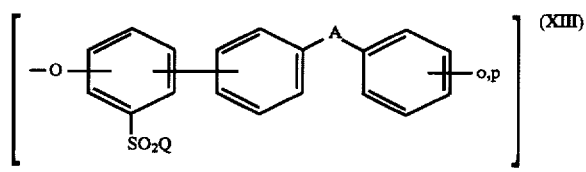

where A is as defined in claim 1 and Q is a halogen.

* * * * *